Oct. 12, 1965   B. A. CHANCELLOR ETAL   3,211,076
AIR COOLING UNIT FOR TRUCK TRACTORS
Filed March 18, 1963

INVENTORS
Byron A. Chancellor
Bonnie Chancellor

BY

ATTORNEY

United States Patent Office 3,211,076
Patented Oct. 12, 1965

3,211,076
AIR COOLING UNIT FOR TRUCK TRACTORS
Byron A. Chancellor and Bonnie Sue Chancellor, both of 4207 Dawes St., Dallas, Tex.
Filed Mar. 18, 1963, Ser. No. 265,938
4 Claims. (Cl. 98—2)

This invention relates to air conditioning or cooling devices for vehicles, and it has particular reference to apparatus by which the cab of a transport tractor can be cooled by the existing refrigeration units on trailers used in highway transportation.

The principal object of the invention resides in the provision of an air circulating unit, having a flexible duct, adapted to be installed in the front wall of a conventional transport trailer whereby cooled air can be transmitted therefrom to the cab of the tractor by which it is drawn, thus obviating the necessity for installing a complete air conditioning unit therein.

Refrigerated trailers are conventionally used in the trucking industry for transporting perishable goods, such as meat, produce, dairy products, and many other commodities, and such vehicles are equipped with automatic refrigeration units by which the temperatures inside are maintained at desired levels. The refrigeration is provided by conventional type cooling coils which are usually mounted in the forward end of the insulated trailer and cooled by a refrigerant acted on by a compressor installed in a suitable housing exteriorily of the vehicle and on the front wall thereof.

A prime object of the invention is that of providing apparatus by which a portion of the refrigerated air within the trailer can be transmitted to the cab of the towing tractor for the comfort of the operator, and to afford means by which the device can be readily connected between the trailer and tractor, or detached, as desired.

Broadly, the invention contemplates the provision of apparatus of simple and economical design and structure which is easily adaptable to installation in any type of refrigerated transport trailer where it is desirable to provide an air cooling system for a tractor cab without installing therein an independent air conditioner unit.

While the foregoing objects are paramount, other and lesser objects will become apparent as the description proceeds, when considered in connection with the appended drawings wherein.

Figure 1:
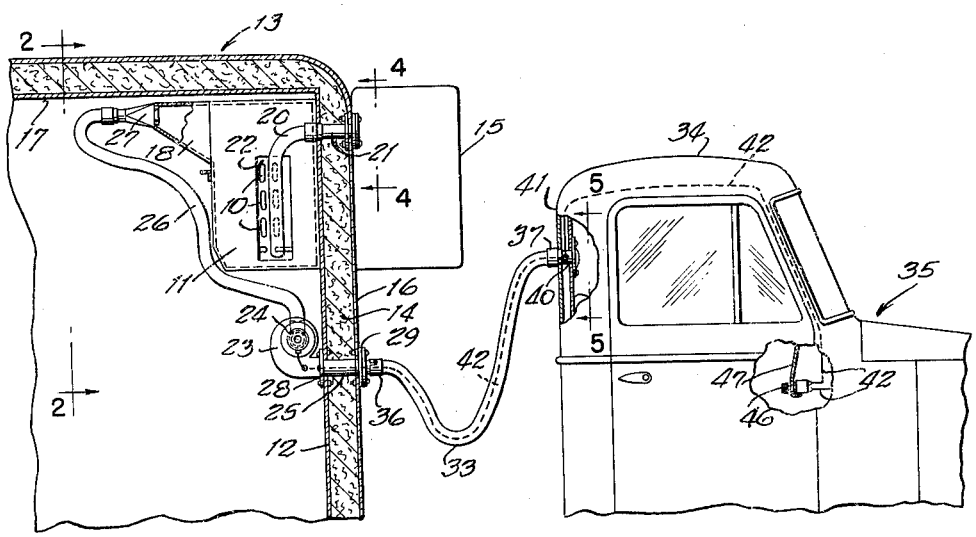
FIGURE 1 is an illustration, on line 1—1 of FIGURE 2, of the invention installed in a tractor-trailer unit, the latter being fragmentarily shown in partial section.
Figure 2:
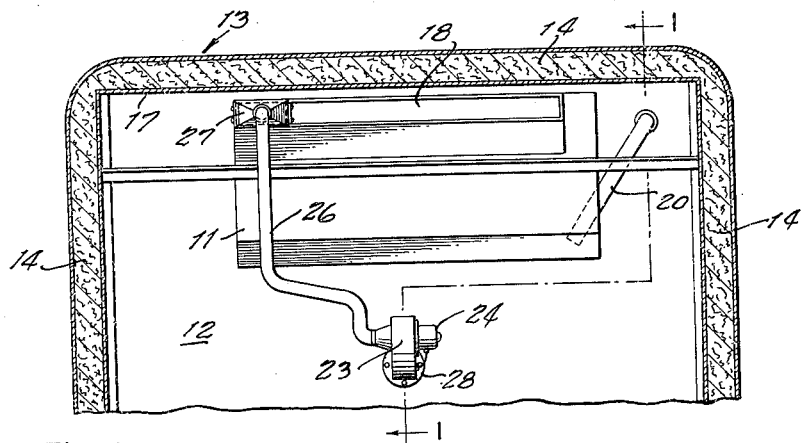
FIGURE 2 is a fragmentary cross sectional illustration, on line 2—2 of FIGURE 1, of a trailer having a refrigeration unit installed in the forward end thereof, and showing the air circulating unit of the invention connected therein.
Figures 3, 4, 5:
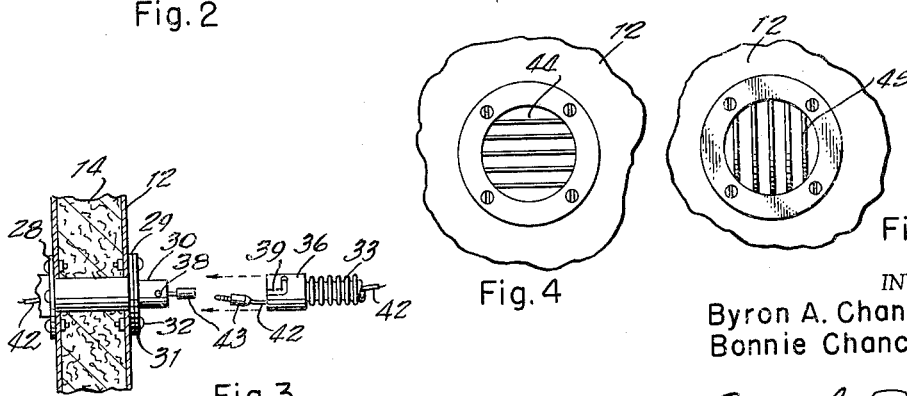
FIGURE 3 is an exploded elevational view of a connector element for the air duct through the wall of the trailer which is fragmentarily shown in vertical section.
FIGURE 4 is an elevational view of the air vent louver in the upper front wall of the trailer, on line 4—4 of FIGURE 1.
FIGURE 5 is an elevational view of the adjustable louvered air outlet in the tractor cab, taken on line 5—5 of FIGURE 1.

Conventional refrigeration equipment for transport trailers, of the type drawn by a tractor along the public highways, usually comprises a bank of refrigeration coils 10 contained within a housing 11 supported on or near the inner front wall 12 of the trailer 13 which has insulation material 14 between the inner and outer walls, as shown in FIGURES 1, 2 and 3. The refrigerant is circulated through the coils 10 by a compressor having a motor (not shown) which is enclosed in a housing 15 attached to the outer front wall 16 of the trailer 13, as shown in FIGURE 1.

The housing 11 is generally elongated and is preferably placed well up on the inner front wall 12 near the ceiling 17, as best shown in FIGURE 1, and has an elongated outlet duct 18 arranged along its inner wall 19 whereby refrigerated air is discharged along the ceiling 17 longitudinally of the trailer 13 by an exhaust fan (not shown) within the housing 11. An air inlet duct 20, by which outside air is conducted into the housing 11, is connected to a louvered coupling 21 arranged through the front wall 12 near the top or ceiling 17 and extends downwardly through an opening 22 into the housing 11 at one end, as shown in FIGURES 1 and 2.

The invention comprises a blower type fan 23 having a motor 24 which is adapted to be attached to the inner end of a tubular coupling 25 arranged through the front wall 12 of the trailer 13, in the manner shown in FIGURES 1, 2 and 3, and has a flexible tube 26 connected thereto whose opposite end is connected to a flared duct 27 attached at one end of outlet duct 18 of the housing 11.

While the structural details of the coupling 25 is not of great importance to the invention, it is desirable that this member should be cylindrical and of such length only as to extend through the insulated front wall 12 and be provided with suitable flanges 28 and 29 by which a proper seal is provided on each side of the wall 12, as shown in FIGURE 3. A fitting 30, having a flange 31, is secured to the outer flange 29 of the coupling 25 by bolts 32, or other suitable device.

A flexible conduit 33 is provided by which refrigerated air is conducted to the cab 34 of the tractor 35, as illustrated in FIGURE 1, and detachable connector elements 36 and 37 are secured to each end of the conduit 33. As shown in FIGURE 3, the connector element 36 is applied to the fitting 30 and secured through the medium of a pin 38 thereon which engages a J-slot 39 in the element 36. The opposite end of the conduit 33 is attached in like manner to a fitting 40 in the rear wall 41 of the tractor cab 34. An electrical conductor 42 is arranged through the conduit 33 for conducting battery current from the tractor 35 to the fan 23 and is connected thereto by a conventional type of coupler assembly 43.

The air inlet coupling 21, which is connected to the duct 20, has a louvered closure 44, shown in elevation in FIGURE 4, and the air inlet opening into the cab 34 has an adjustable louver 45, shown in elevation in FIGURE 5. A switch 46 is connected into the electrical conductor 42, and is arranged on the instrument panel 47, by which the fan 23 can be operated.

It is, of course, common practice to use different tractors with different trailers, and the invention affords a ready means by which such interchange may be accomplished with a minimum of effort when desired. Since only a very small percentage of the refrigerated air within the trailer is affected, the comfort of the tractor operator is benefitted without the installation of expensive air conditioning equipment in the tractor cab.

The invention, while shown and described in substantial detail, is capable of being modified in structure and design without departing from the spirit and intent thereof or the scope of the appended claims.

What is claimed is:

1. In combination with a transport tractor and a trailer unit having a refrigerting mechanism therein, an air cooling device for the cab of the tractor, comprising, an air conduit connected to said refrigerating mechanism internally of said trailer and extending through the front wall thereof, a fan connected in said conduit and having an electric motor for driving the same, a second and flexible air conduit having one end detachably connected to said first conduit and having its opposite end extending through the wall of said cab, an electrical conductor in said second conduit connecting said fan motor to the battery of said tractor, and a switch in said conductor in said cab.

2. In combination with a transport tractor and a trailer towed by said tractor, and a refrigerating unit in a housing in said trailer, an air cooling device for the cab of said tractor, comprising, an air conduit connected at one end to said refrigerating unit in said trailer and having its opposite end extending through the front wall of said trailer, a fan having a motor connected in said conduit and capable of drawing cooled air from said refrigerating unit, a second flexible conduit having detachable connection at one end to said first conduit exteriorly of said trailer and having its opposite end connected through a wall of said tractor cab, and an electrical conductor arranged through said second conduit connecting said fan motor with an electrical source in said tractor.

3. An air cooling device for transport tractors, as described in claim 2, wherein the housing for said refrigeration unit has an elongated air outlet chute transversely of the axis of said trailer, and said first conduit is connected to one end of said air outlet chute.

4. An air cooling device in combination with the cab of a transport tractor having a trailer attached thereto, the said trailer having a refrigerating unit therein, comprising, in combination, an air conduit in said trailer having one end attached to said refrigerating unit and having its opposite end extending through the front wall of said trailer, a fan connected in said conduit having a motor, a second and flexible air conduit detachably connected at one end to said first conduit exteriorly of said trailer and having its opposite end extending through a wall of said tractor cab, and an electrical conductor connecting said fan motor to an electrical source on said tractor.

References Cited by the Examiner
UNITED STATES PATENTS

| | | | |
|---|---|---|---|
| 2,091,594 | 8/37 | Innes | 98—2.5 |
| 2,443,472 | 6/48 | Mayo | 62—323 |
| 2,796,822 | 6/57 | Nikolajevic | 98—94 |
| 3,057,171 | 10/62 | Hulse | 62—239 |

ROBERT A. O'LEARY, *Primary Examiner.*

MEYER PERLIN, *Examiner.*